(12) United States Patent
Dawson et al.

(10) Patent No.: US 11,095,085 B2
(45) Date of Patent: Aug. 17, 2021

(54) SYSTEM AND METHOD FOR LASER SYSTEM HAVING NON-PLANAR THIN DISC GAIN MEDIA

(71) Applicant: LAWRENCE LIVERMORE NATIONAL SECURITY, LLC, Livermore, CA (US)

(72) Inventors: Jay W. Dawson, Livermore, CA (US); Ronald Lacomb, Newport, RI (US)

(73) Assignees: Lawrence Livermore National Security, LLC, Livermore, CA (US); The Government of the United States as represented by the Secretary of the Navy, Newport, RI (US)

( * ) Notice: Subject to any disclaimer, the term of this patent is extended or adjusted under 35 U.S.C. 154(b) by 0 days.

(21) Appl. No.: 16/480,882

(22) PCT Filed: Jan. 25, 2018

(86) PCT No.: PCT/US2018/015306
§ 371 (c)(1),
(2) Date: Jul. 25, 2019

(87) PCT Pub. No.: WO2018/140638
PCT Pub. Date: Aug. 2, 2018

(65) Prior Publication Data
US 2019/0393667 A1    Dec. 26, 2019

Related U.S. Application Data

(60) Provisional application No. 62/450,226, filed on Jan. 25, 2017.

(51) Int. Cl.
*H01S 3/06*   (2006.01)
*H01S 3/04*   (2006.01)
(Continued)

(52) U.S. Cl.
CPC ............ *H01S 3/0604* (2013.01); *H01S 3/042* (2013.01); *H01S 3/0405* (2013.01);
(Continued)

(58) Field of Classification Search
CPC ...... H01S 3/0604; H01S 3/0405; H01S 3/042; H01S 3/0621; H01S 3/08081;
(Continued)

(56) References Cited

U.S. PATENT DOCUMENTS

| 7,492,805 B2 | 2/2009 | LaComb et al. |
| 2002/0110164 A1* | 8/2002 | Vetrovec ................. H01S 3/042 372/36 |

(Continued)

FOREIGN PATENT DOCUMENTS

| EP | 1 411 608 A2 | 4/2004 |
| WO | WO-2014076694 A1 | 5/2014 |

OTHER PUBLICATIONS

International Search Report and Written Opinion issued in PCT/US2018/015306, dated May 24, 2018; ISA/KR.

(Continued)

*Primary Examiner* — Kinam Park
(74) *Attorney, Agent, or Firm* — Harness, Dickey & Pierce, P.L.C.

(57) ABSTRACT

The present disclosure relates to a laser system. The laser system may have at least non-flat gain media disc. At least one pump source may be configured to generate a beam that pumps the non-flat gain media disc. A laser cavity may be formed by the pump source and the non-flat gain media disc. An output coupler may be included for receiving and directing the output beam toward an external component.

18 Claims, 19 Drawing Sheets

(51) Int. Cl.
*H01S 3/042* (2006.01)
*H01S 3/08* (2006.01)
*H01S 3/081* (2006.01)
*H01S 3/0941* (2006.01)
*H01S 3/16* (2006.01)
*H01S 3/094* (2006.01)

(52) U.S. Cl.
CPC .......... *H01S 3/0612* (2013.01); *H01S 3/0621* (2013.01); *H01S 3/0816* (2013.01); *H01S 3/0817* (2013.01); *H01S 3/08081* (2013.01); *H01S 3/0941* (2013.01); *H01S 3/0615* (2013.01); *H01S 3/09408* (2013.01); *H01S 3/094084* (2013.01); *H01S 3/1603* (2013.01); *H01S 2301/02* (2013.01)

(58) Field of Classification Search
CPC .... H01S 3/0816; H01S 3/0817; H01S 3/0941; H01S 3/1603; H01S 3/0615; H01S 3/0612; H01S 3/094084; H01S 2301/02
See application file for complete search history.

(56) References Cited

U.S. PATENT DOCUMENTS

| | | | | |
|---|---|---|---|---|
| 2004/0264528 | A1* | 12/2004 | Kruschwitz | H01S 5/36 372/39 |
| 2005/0083987 | A1* | 4/2005 | Hunt | G02B 5/3083 372/105 |
| 2008/0304534 | A1* | 12/2008 | Sumida | H01S 3/0602 372/67 |
| 2010/0254424 | A1 | 10/2010 | Curtin et al. | |
| 2011/0150013 | A1* | 6/2011 | Spinelli | H01S 3/042 372/18 |
| 2012/0224595 | A1* | 9/2012 | Caprara | H01S 3/109 372/22 |
| 2013/0301117 | A1* | 11/2013 | Zapata | H01S 3/0604 359/342 |
| 2013/0322475 | A1 | 12/2013 | LaComb | |
| 2015/0109662 | A1 | 4/2015 | Cates et al. | |

OTHER PUBLICATIONS

Christian Stewen et al. "A 1-kW CW Thin Disc Laser", IEEE Journal of Selected Topics in Quantum Electronics, Aug. 2000, vol. 6, No. 4, pp. 650-657.

Hostasa, Jan et al. "Layered Yb: YAG ceramics produced by two different methods: processing, characterization, and comparison", Optical Engineering, Soc. of Photo-Optical Instrumentation Engineers, Bellingham, vol. 55, No. 8, Aug. 1, 2016 (Aug. 1, 2016), p. 87104, XP060075544, ISSN: 0091-3286, DOI: 10.1117/1.OE.55.8.087104.

Supplementary European Search Report issued in corresponding European Patent Application 18744688.5 dated Aug. 6, 2020.

* cited by examiner

Hemi-spherical version of spherical laser gain media with HR reflector on outside of sphere, gain medium may be on inside. Output coupler on or near flat

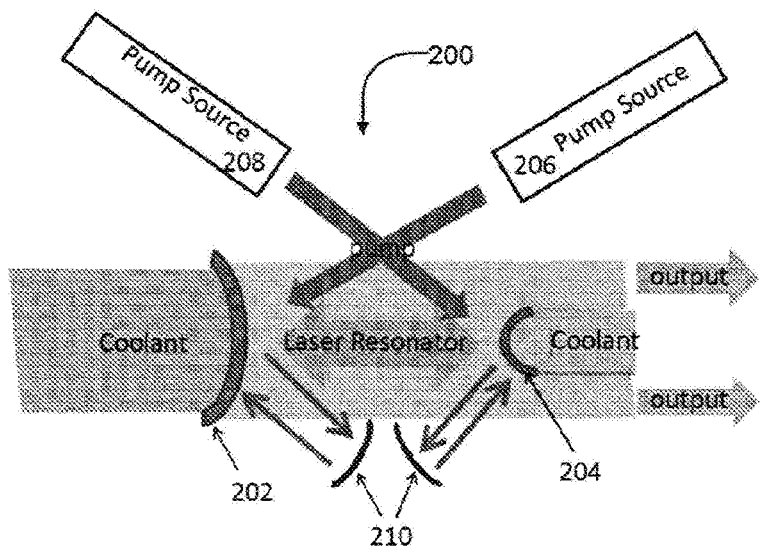
FIGURE 7
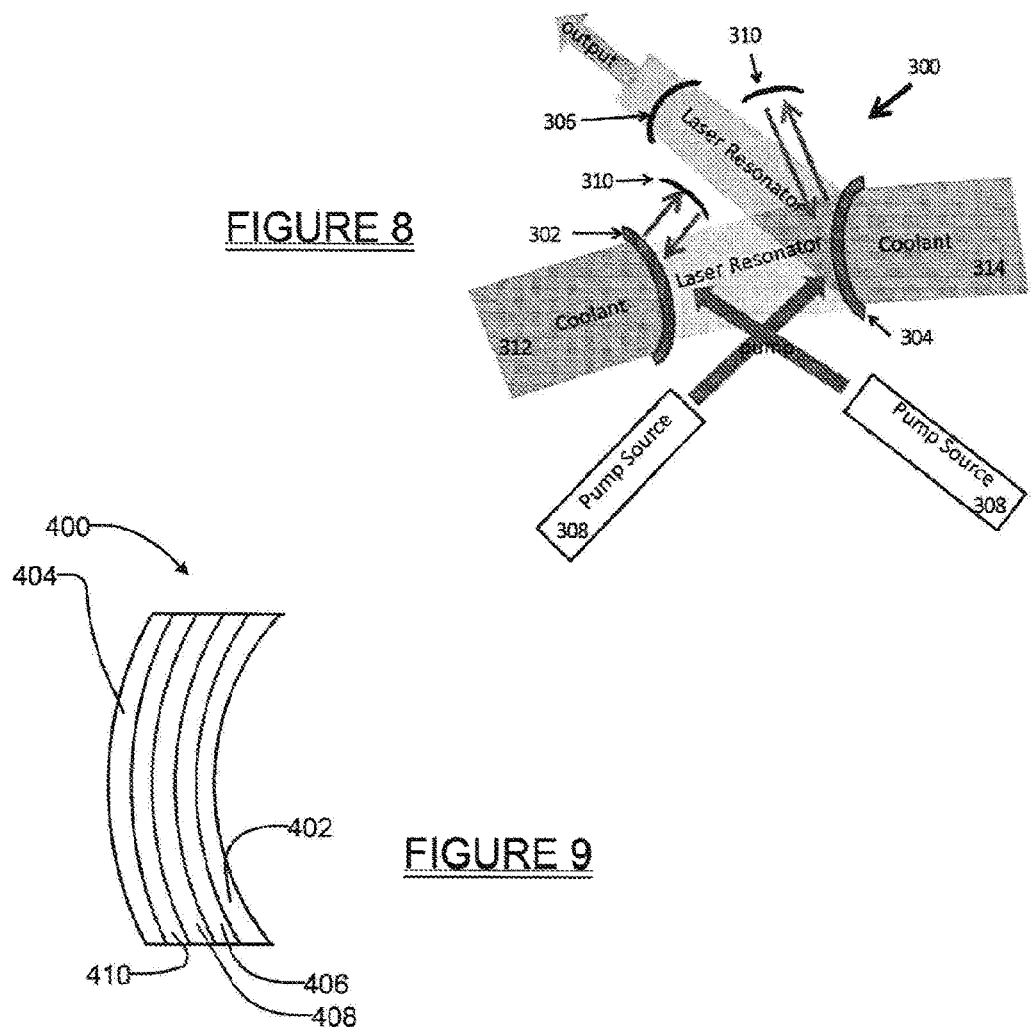
FIGURE 8
FIGURE 9

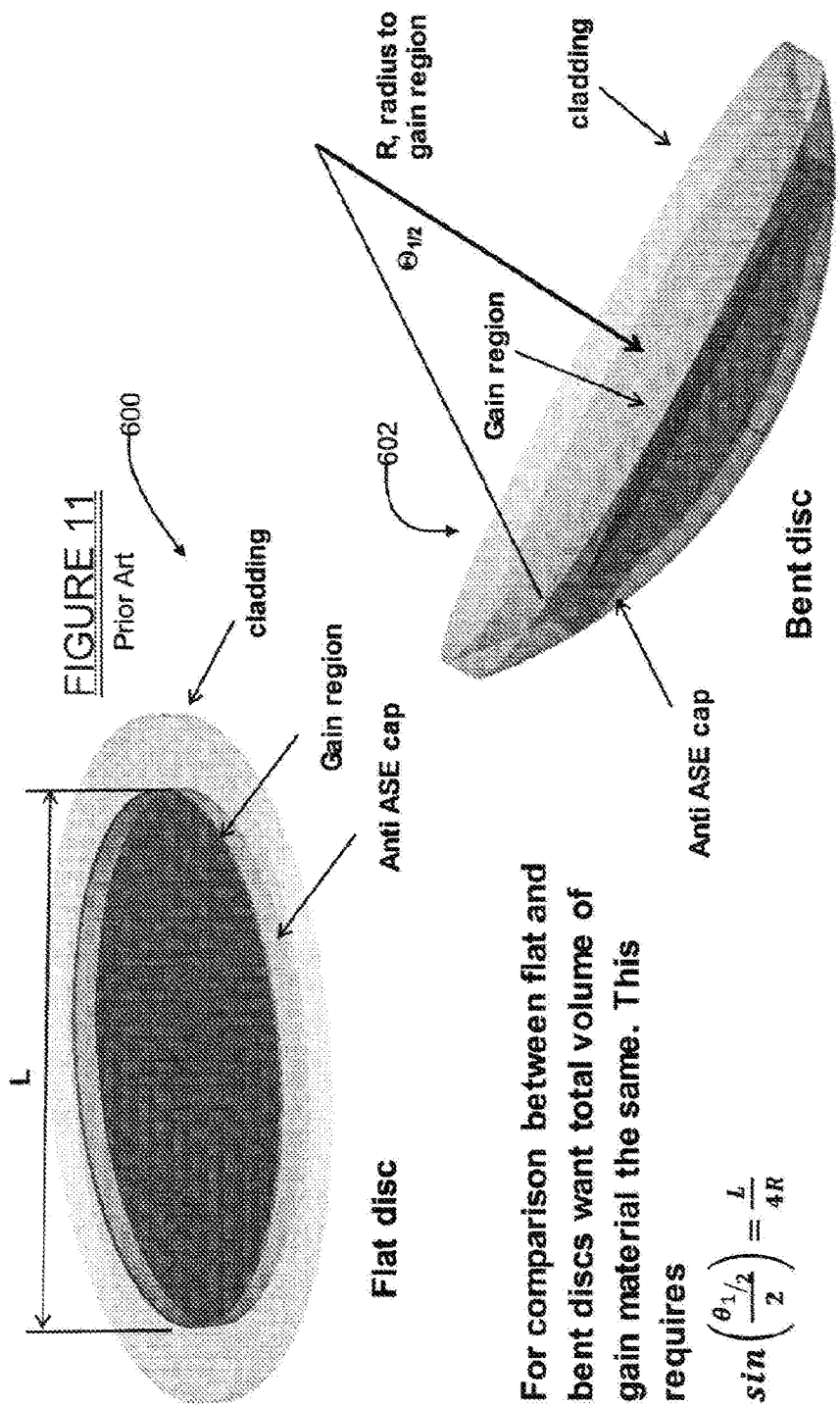

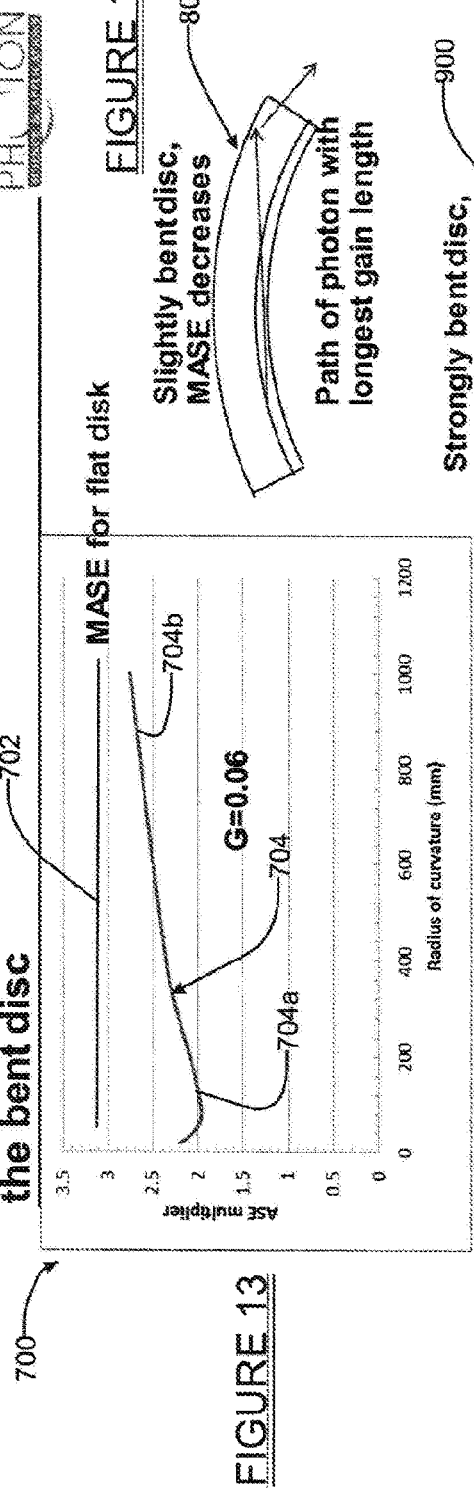

Thicker cap lowers ASE multiplier

- Only a modest improvement is seen with a flat disc

- Because a shorter radius can be used with the bent disc, the ASE multiplier can be reduced significantly by using a thicker cap

Ray with largest ASE multiplier

Flat disc <u>FIGURE 21</u>  *Prior Art*

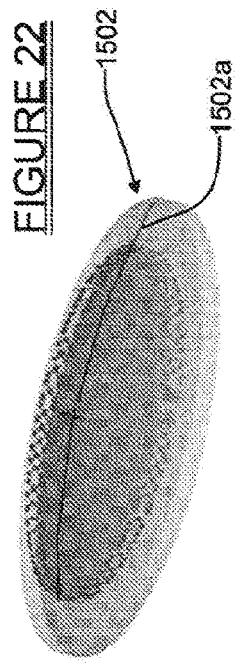

Concave, R=-50mm  <u>FIGURE 22</u>

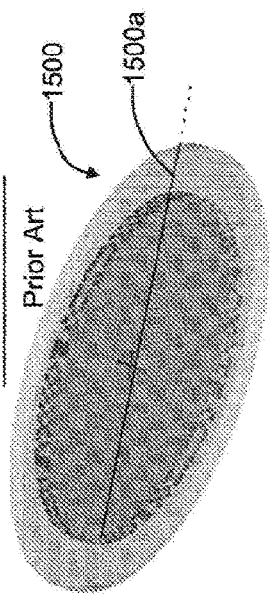

- Ray with maximum path length is sometimes used to estimate ASE multiplier; this is an example in which that isn't correct

- In both cases the ray with the maximum ase multiplier starts at one edge and travels through the center and out into the cladding. Only difference is a few reflections from the HR coating in the concave case.
  — Flat case, maximum ase multiplier is 1445
  — Concave case, maximum ase multiplier is 1495

- Despite this average ase multipliers are very different, 3.2 for flat disc, 8.9 for concave disc.

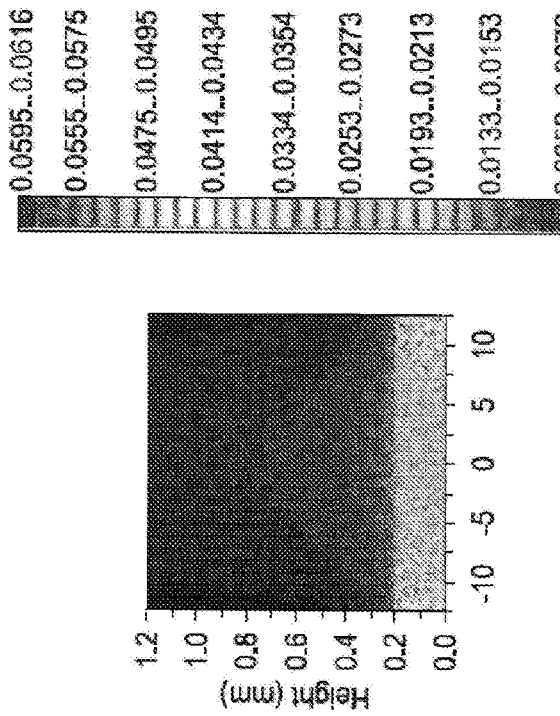
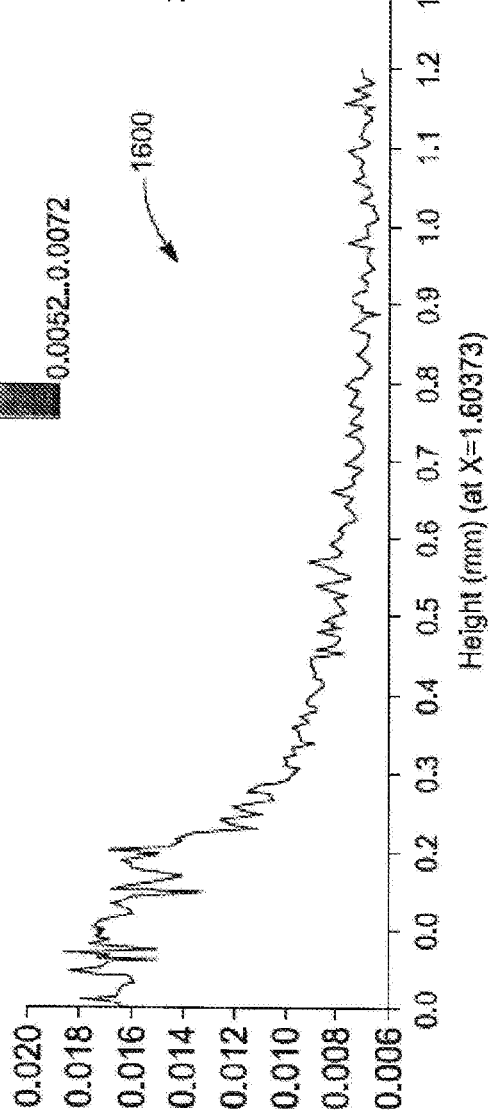
FIGURE 23
(Prior Art)

Effect of cap thickness on ASE - flat disc

- This is for a round disk amplifier, 25mm diameter, 0.2mm thick

- Beyond about 2mm, increasing the thickness of the cap doesn't decrease the ASE multiplier

- This doesn't imply that an anti-ASE cap doesn't help for a flat disc
  – With a 0.25mm cap the ase multiplier goes up to 7.4 at a gain of 0.06
  – With no cap at all MASE>60

A curved disc allows larger pumped area

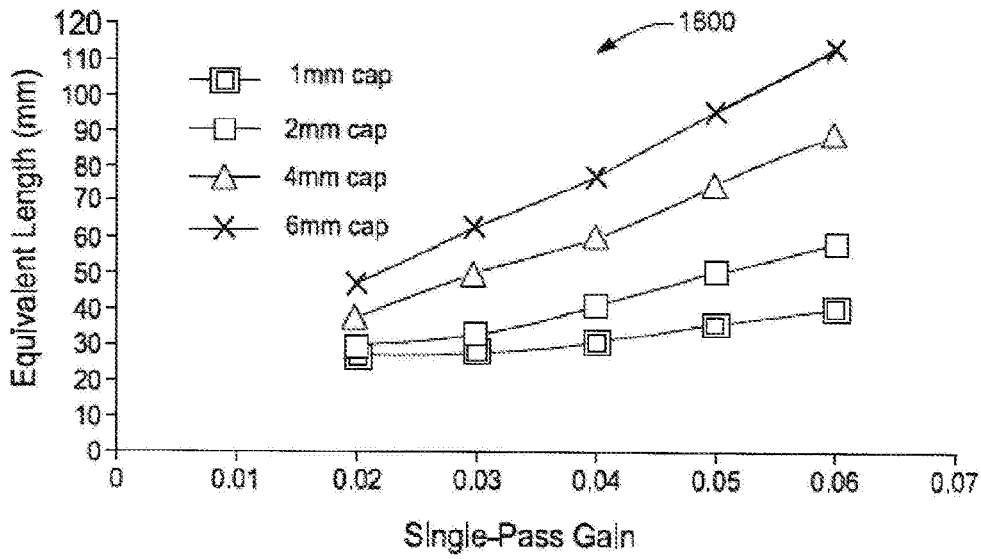

FIGURE 26

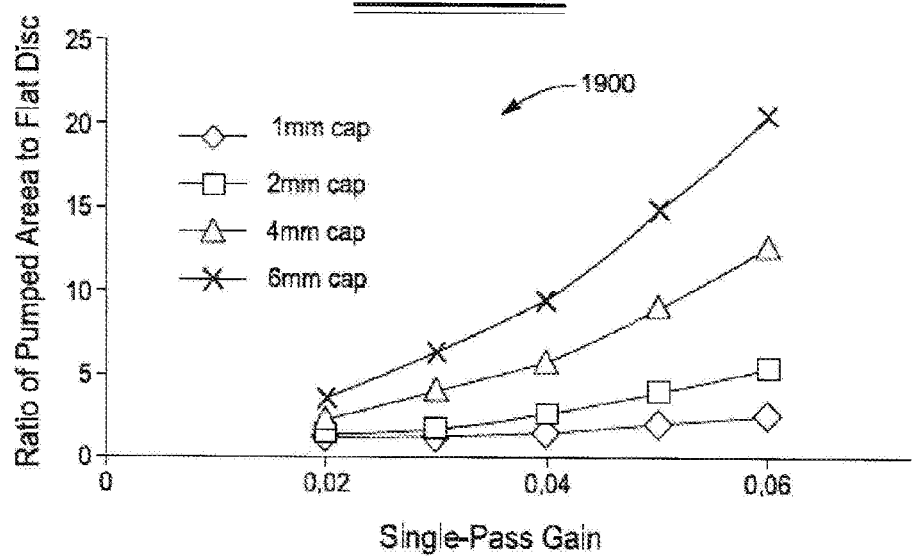

FIGURE 27

- The size of the active (pumped) area is increased keeping the disc radius at the optimum value so that the ASE multiplier for a given gain and cap thickness is the same as in the flat disc case shown in Figure 25
  - Figure 26 shows equivalent length (diameter of a flat disc with the same area) arrived at in this way
  - Figure 27 shows the ratio of pumped area of these designs to the area of the flat disc in the previous slide
    - Output power should be roughly in the same ratio
- Improvement at all but the lowest gains is significant
- Unlike the flat disc case, making the cap thicker greatly improves the design because it allows for a shorter radius

SYSTEM AND METHOD FOR LASER SYSTEM HAVING NON-PLANAR THIN DISC GAIN MEDIA

CROSS-REFERENCE TO RELATED APPLICATIONS

This application is a U.S. National Phase Application under 35 U.S.C. 371 of International Application No. PCT/US2018/015306, filed on Jan. 25, 2018, which claims the benefit of U.S. Provisional Application No. 62/450,226, filed on Jan. 25, 2017. The entire disclosures of the above applications are incorporated herein by reference.

STATEMENT OF GOVERNMENT RIGHTS

The United States Government has rights in this invention pursuant to Contract No. DE-AC52-07NA27344 between the U.S. Department of Energy and Lawrence Livermore National Security, LLC, for the operation of Lawrence Livermore National Laboratory.

FIELD

The present application relates to a laser system and method having a disc-like gain media formed with a non-flat shape, and more specifically, it relates to a means for reducing the generation of amplified spontaneous emission enabling scaling of the transverse modal area to scale the average output power.

BACKGROUND

This section provides background information related to the present disclosure. Thin disk lasers make use of a thin disc gain media which forms part of the lasing cavity. The thin disc gain media is typically provided with a planar (i.e., flat) shape. This shape, while being generally effective for the purpose of enabling the laser system to produce a uniform output beam with minimum distortions due to thermal gradients, does have certain limitations. One such limitation is the susceptibility of the flat thin disc media to transverse amplified spontaneous emission ("ASE"). Transverse ASE limits the spot size of the output laser beam that can be produced using the flat thin disc gain media, which in turn limits the power that can be delivered by the output laser beam. Another limitation is the susceptibility of the flat thin active disks to thermal induced lens effects which can also limit laser performance. To scale the average power of a thin disk laser, an anti-ASE cap (undoped index matched layer) is typically utilized to mitigate the effects of ASE thus enabling power scaling via modal enlargement. This approach works up to a point, but eventually deleterious effects of ASE limit further scaling. Accordingly, there exists a need for further improvements in the laser art for laser systems that are capable of producing beams with even larger spot sizes than previously developed laser systems. Utilization of a non-flat (curved) disk enables further power scaling over that supported by flat thin disk laser architectures.

SUMMARY

This section provides a general summary of the disclosure, and is not a comprehensive disclosure of its full scope or all of its features.

In one aspect the present disclosure relates to a laser system. The laser system may comprise at least one pump source configured to generate a beam that pumps a non-flat gain medium disc, and a laser cavity. The laser cavity may be formed by at least one optical component and a non-flat gain media disc. An output coupler may be included in these optical components.

In another aspect the present disclosure relates to a laser system. The laser system may comprise a first pump source configured to generate a first beam, a second pump source configured to generate a second beam, a first mirror for receiving the first beam, and a second mirror for receiving the second beam. The laser system may also comprise a non-flat, thin disc gain media optical component for receiving the first and second beams reflected from the first and second mirrors thus exciting the non-flat gain media disc. An output coupler may be included for forming a resonant laser cavity.

In another aspect the present disclosure relates to an optical component for use in forming a laser cavity of a laser system. The optical component may comprise a thin disc gain media having at least one surface with a hemispherical shape. A highly reflective coating may be applied to a surface of the hemispherical shaped thin disc gain media, constituting an active mirror. The optical component may also include a cap layer consisting of a media refractive index and coefficient of thermal expansion matched to the gain media. Furthermore the cap layer may also include an anti-reflective coating or other wavelength dependent coating.

In another aspect the present disclosure relates to a method for forming a laser oscillator system. The method may comprise using at least one pump source configured to generate a pump beam incident upon the non flat gain mirror. The method may further comprise using a laser cavity formed by the non-flat gain mirror and at least one additional optical component forming a resonant cavity. The resonate cavity may include one or more non-flat gain mirrors. The method may further comprise using an output coupler to receive and direct the output beam toward an external component.

In another aspect the present disclosure relates to a method of forming a laser amplifier system. The method may comprise using at least one pump source configured to generate a beam incident on the non-flat gain media disc. The method may further comprise an extraction or signal beam interacting with the gain media disc by bouncing off said gain media disc one or more times gaining energy with each pass.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure. The accompanying drawings, which are incorporated into and constitute a part of the specification, illustrate specific embodiments of the apparatus, systems, and methods and, together with the general description given above, and the detailed description of specific embodiments serve to explain the principles of the apparatus, systems, and methods.

In the drawings:

FIG. 7 shows an example of a laser system in accordance with the present disclosure representing an unstable laser architecture formed by two three-dimensional active mirrors;

FIG. 8 shows an example of a laser system in accordance with the present disclosure which forms a multi-active mirror linear optical resonator laser consisting of two three-dimensional active mirror elements and a third output coupler;

FIG. 9 shows one example of a three dimensional active mirror having high reflection (HR) coatings on one exterior surface 402 or 404 and an anti-reflection coating on the opposite surface 404 or 402. The internal layers consisting of at least one layer of active media and at least one layer matched in refractive index and coefficient of thermal expansion acting as and anti-ASE cap.

FIGS. 11 and 12 illustrate a comparison between a prior art flat gain media disc (FIG. 11) and a curved gain media disc (FIG. 12) in accordance with one embodiment of the present disclosure;

FIG. 13 shows a graph illustrating how the MASE for a flat disc (line 702) is constant and that utilization of a non-flat active disk reduces the MASE;

FIG. 14 shows a graph illustrating how the MASE decreases for a curved disk with only a minimal curvature by effectively reducing the longest gain path a photon may take through the disk;

FIG. 15 shows a graph illustrating how the MASE increases for a curved disc with a more signature curvature; Demonstrating that an optimal radius for the hemispherical active disk is warranted.

FIG. 21 illustrates a prior art flat gain media disc and a path length of one ray;

FIG. 22 illustrates a curved gain media disc with a path length of one ray;

FIG. 23 illustrates a graph of a distribution of the ASE of a conventional flat gain media disc, relative to height;

FIGS. 26 and 27 shows graphs which illustrate examples of how a curved gain media disc allows for a larger pumped area;

Figure 28:
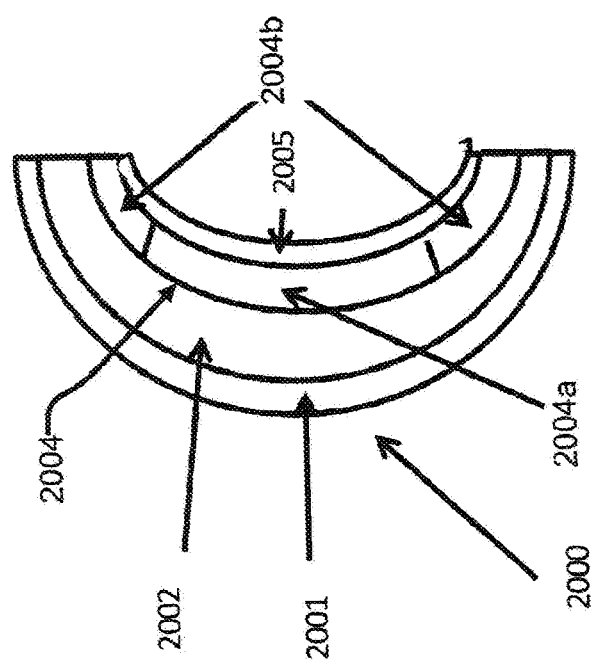
Figure 29:
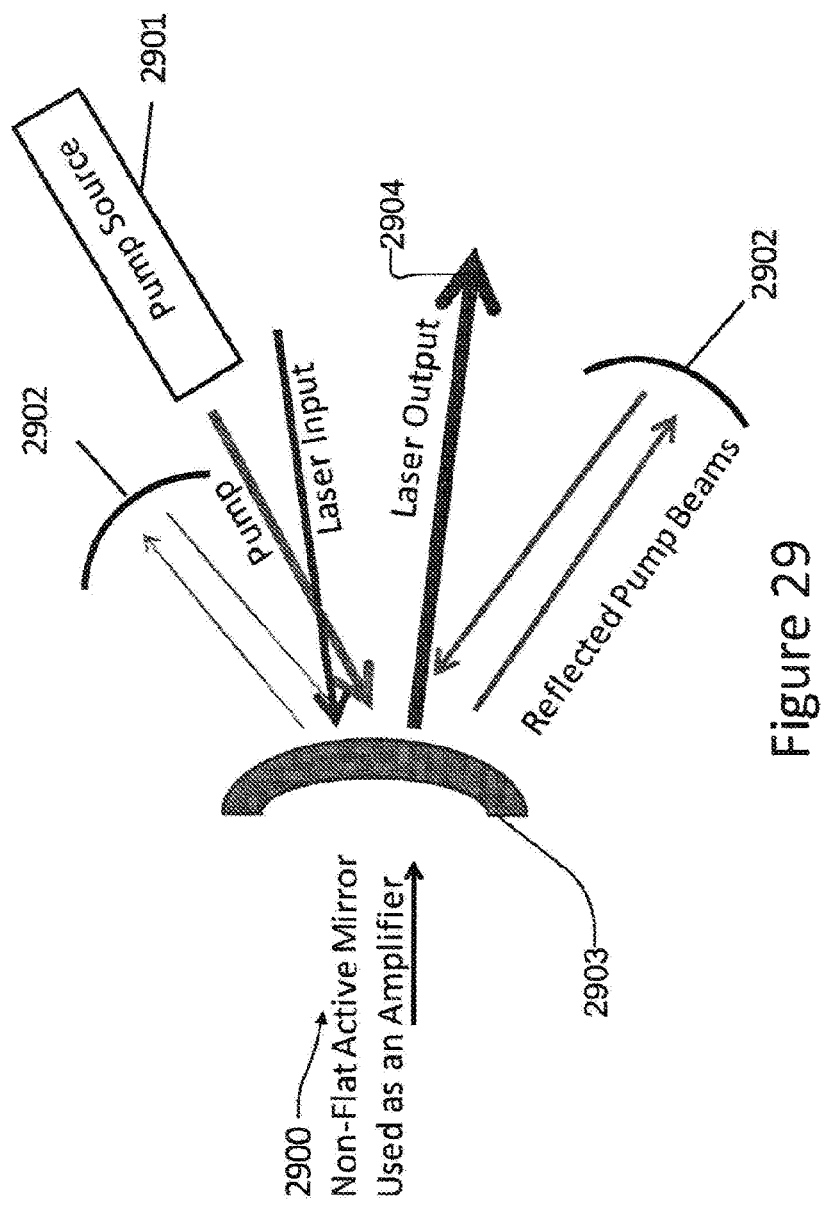

FIG. 28 shows a curved (convex) mirror with a multi-layer substrate featuring exterior optical coatings (serving as wavelength dependent reflection/anti-reflection surface), the multiple layers are refractive index and coefficient of thermal expansion matched and have a gain media defined within a central portion of the mirror. The gain media is defined both radially and to the central portion of the mirror allowing gain-tailoring by offsetting confinement factors of the modal constituency supported by the laser resonator to favor fundamental mode operation for power scaling; and FIG. 29 illustrates a curved active disk mirror configured to operate as a laser amplifier.

Corresponding reference numerals indicate corresponding parts throughout the several views of the drawings.

DETAILED DESCRIPTION

Example embodiments will now be described more fully with reference to the accompanying drawings.

Referring to the drawings, to the following detailed description, and to incorporated materials, detailed information about the apparatus, systems, and methods is provided including the description of specific embodiments. The detailed description serves to explain the principles of the apparatus, systems, and methods described herein. The apparatus, systems, and methods described herein are susceptible to modifications and alternative forms. The application is not limited to the particular forms disclosed. The application covers all modifications, equivalents, and alternatives falling within the spirit and scope of the apparatus, systems, and methods as defined by the claims.

The present invention utilizes a gain and index tailored multi-layered (composite) non-flat (curved) disk to further reduce the deleterious effects of ASE by reducing the spontaneous emission interaction length within the gain media. This allows the laser to be substantially scaled in power output beyond what is achievable utilizing conventional disk laser architectures.

Figure 1:
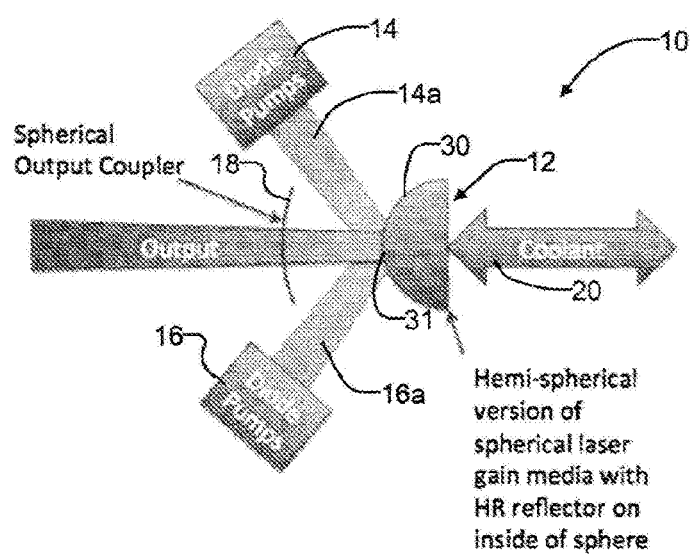
FIG. 1 shows a high level diagram of one example of a solid-state laser apparatus in accordance with the present disclosure incorporating a non-flat gain media disc.

Referring to FIG. 1, there is shown one example of a solid-state laser apparatus 10 in accordance with the present disclosure. The apparatus 10 in this example makes use of hemi-spherical thin disc gain media 12 that is illuminated by a pair of pump sources, shown in this example as diode pump lasers 14 and 16. An output coupler 18, along with the thin disc gain media 12, forms the lasing cavity. A coolant 20 may be supplied to the thin disc gain media 12 to cool the thin disc gain media.

Figure 2:
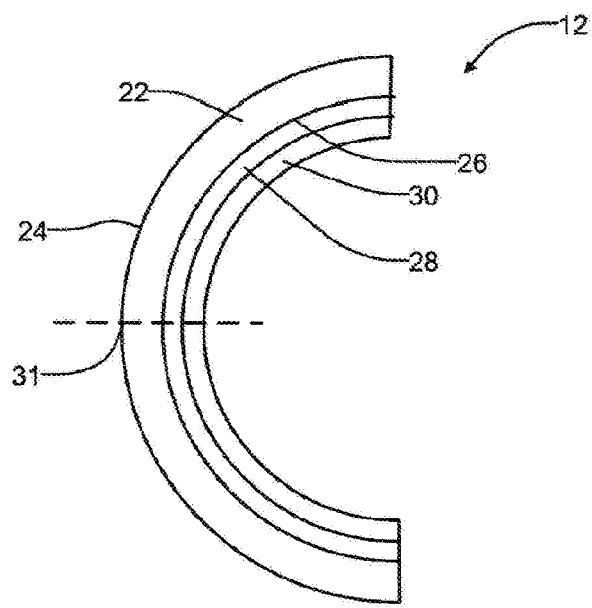
FIG. 2 shows a simplified cross-sectional drawing of the non-flat gain media disc of FIG. 1.

The curved thin disc gain media 12 is shown in high level form in FIG. 2 and may include a substrate portion 22 having an outer surface 24, an inner surface 26, a gain media 28, and a high reflection ("HR") coating 30 covering the gain media coating 28. The diode pump lasers 14 and 16 provide pump laser beams 14a and 16a that illuminate a spot through the outer surface 24 of the thin disc gain media 12 at a vertex 31 of the thin disc gain media creating an excited state capable of providing optical gain. A resonant laser cavity is formed between the excited laser gain media 28 at the vertex 31 and the output coupler 18 forming a laser beam that may exit the device via the output coupler 18 port. The substrate portion 22 and the gain media 28 are index of refraction and coefficient of thermal expansion matched to reduce reflection and stress between the layers. The curved configuration of the thin disc gain media 12 helps to reduce transverse ASE and may enable even larger spot sizes to be generated with any given laser system. The curved configuration of the thin disc gain media 12 may also enable better mode selection, and may also be intrinsically stronger and more robust, and thus be more resistant to thermal induced deformations.

Figure 3:
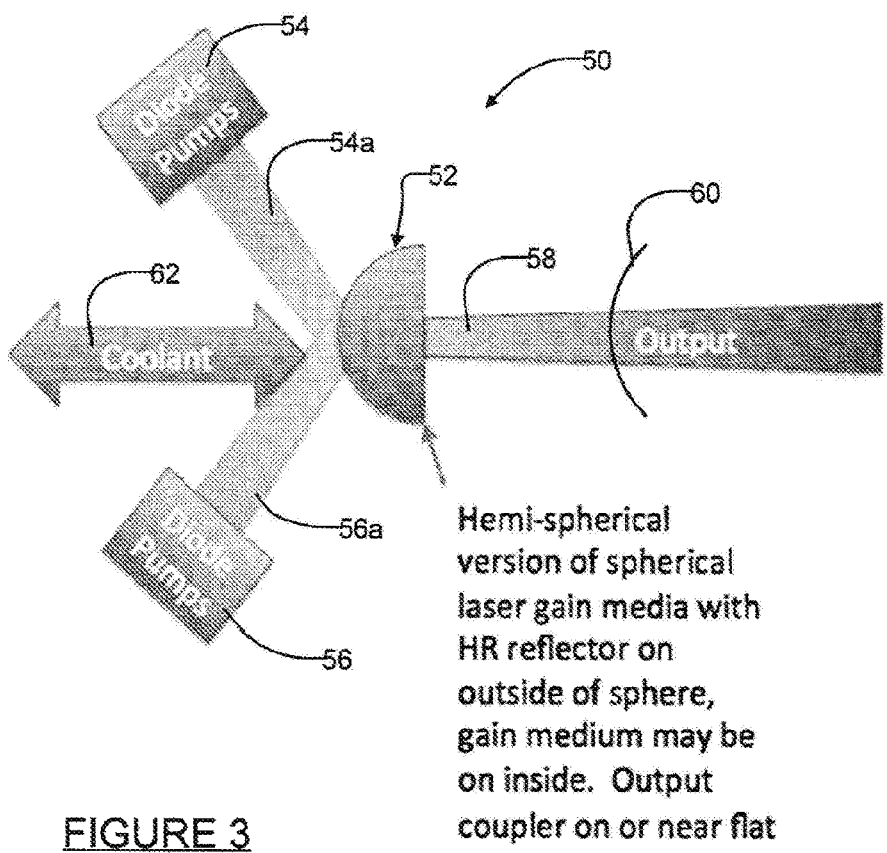
FIG. 3 shows a laser system in accordance with another embodiment of the present disclosure.

FIG. 3 shows a laser system 50 in accordance with another embodiment of the present disclosure. In this example a hemi-spherical thin disc gain media 52 receives energy via a pump beam 54a from a first pump source, which in this example is shown as diode pump laser 54, and lasing beam 56a from a second pump source, which is shown as diode pump laser 56. The lasing beams 54a and 56a excite the thin disc gain media 52. An output beam 58 is formed in the resonant laser cavity comprising the excited thin disc gain media region, the HR coating 72 and the output coupler 60. Optical energy in the form of an output beam exits the cavity through the output coupler 60. A coolant 62 may be supplied to the thin disc gain media 52 to cool it.

Figure 4:
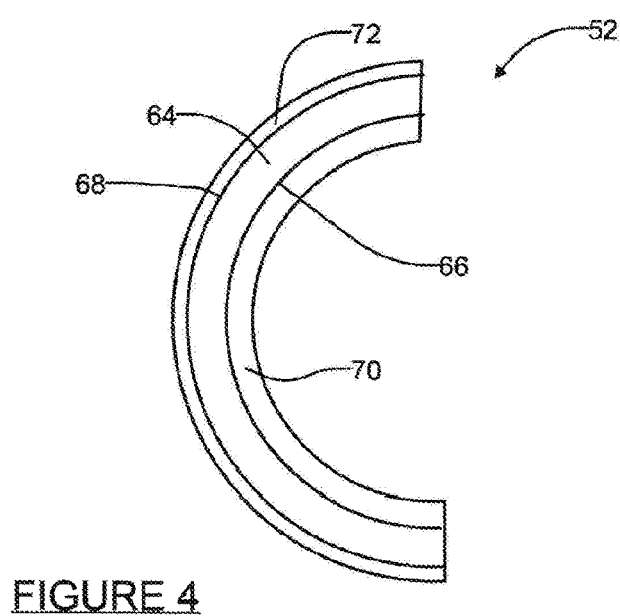
FIG. 4 shows a side cross-sectional view of an example of a thin disc gain media of the present disclosure having a substrate with an inner surface and an outer surface, and where a coating comprising a gain media is placed on the inner surface while an HR coating is placed on the outer surface.

Referring to FIG. 4, the thin disc gain media 52 in this example has a substrate 64 with an inner surface 66 and an outer surface 68. A coating 70 comprising a gain media is placed on the inner surface 66 while an HR coating 72 is placed on the outer surface 68. As will be discussed below, this configuration (i.e. direction of curvature of the disc relative to the geometry of the laser resonator) may not provide the benefit of reduced ASE below the flat disc case. However, this configuration may have other advantages, such as improved optical alignment for some specific laser configurations. The example is included in the range of examples of non-flat thin disc geometries but may not be the optimal choice of curvature for power and energy scaling.

Figure 5:
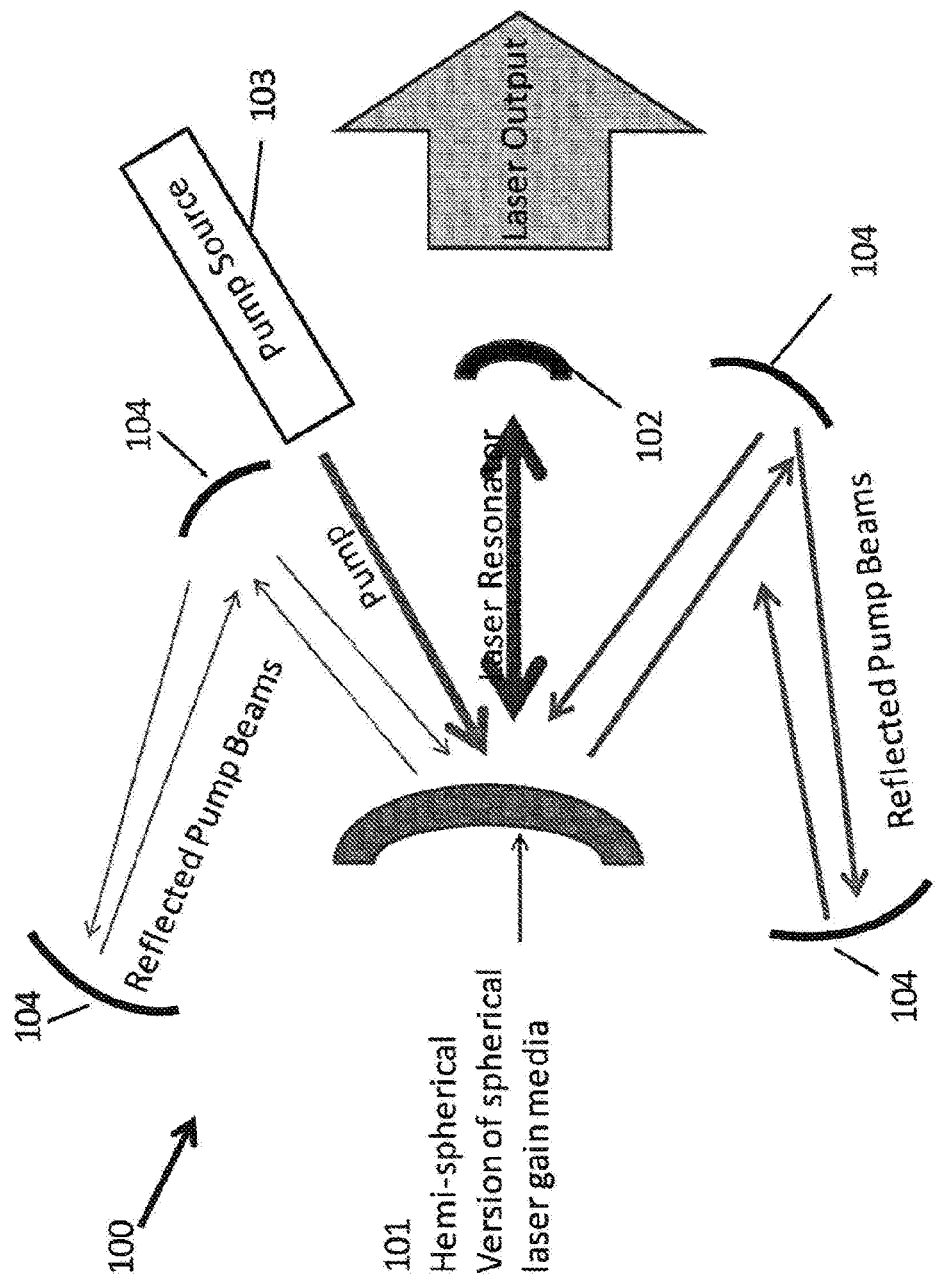
FIG. 5 illustrates an example of a solid-state laser apparatus in accordance with FIG. 1 illustrating reflective mirrors to redirect un-absorbed pump radiation back to the active non-flat active gain media.

Referring to FIG. 5, a solid-state laser apparatus 100 is shown in accordance with the embodiment of FIG. 1. In this example, the apparatus 100 comprises a non-flat active mirror 101 and an output coupling mirror 102 forming a laser resonator. The active hemispherical mirror 101 is optically pumped by an external pump source (103). The active hemispherical mirror 101 absorbs the pump energy and re-emits radiation into the laser resonator. The pump beam which is reflected by the active hemispherical mirror 101 is redirected back to the active hemispherical mirror by reflectors 104 to increase the pump absorption efficiency.

Figure 6:
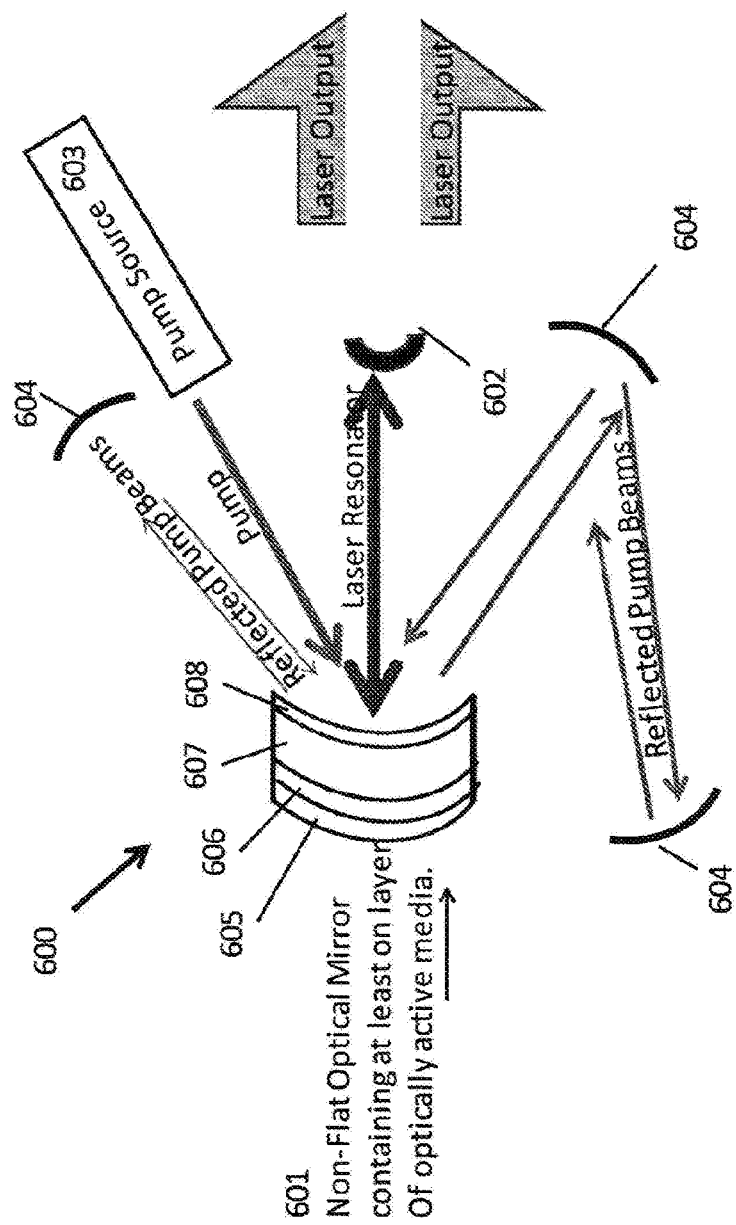
FIG. 6 shows one example of an active mirror in accordance with the present disclosure which may consist of a solid-state matrix material with a varying dopant concentration, and which may have a refractive index as a function of thickness.
Figure 20:
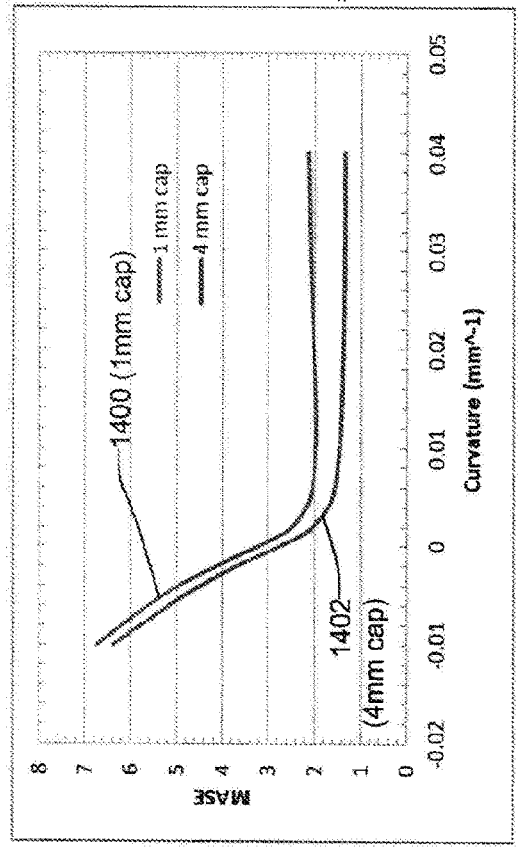
FIG. 20 shows a pair of graphs that illustrate how the curvature (both negative and positive) of a curved gain media disc may influence the MASE; With respect to laser resonator +R values correspond to convex mirrors, −R values correspond to concave mirrors.

Referring to FIG. 6, a solid-state laser apparatus 600 is illustrated which consists of two optical mirrors 601,602 separated by a distance, thus forming an optical resonator (e.g., stable, unstable, linear, ring, etc.). The mirror 601 comprises a non-flat active mirror and may consist of a plurality of layers including at least one optically active layer, optical coating layers and an anti-ASE layer. In one configuration, the layers are as specified in FIG. 6, with an outside high reflective coating 605, an optically active layer 606 capable of providing optical gain, an anti-ASE cap layer 607 and an anti-reflection coating 608. Other configurations of the layers and number of layers are possible. The three dimensional shape of the non-flat optical mirror 601 containing the optically active media 601 may be in the form of a hemisphere or other three dimensional curved shape, for example an ellipse, a parabola, etc., applicable to a specific resonator design which may include ether a concave (−R) or convex (+R) orientation of the active mirror 601. Referring to FIG. 20, active mirrors with a +R or convex curvature are beneficial towards mitigating the detrimental effects of ASE, whereas concave mirrors (−R) may not be beneficial for ASE mitigation but may be beneficial towards other resonator configurations (i.e., stable geometries not supported by a convex active mirror) and/or parametric sensitivities, for example mirror misalignments, or thermal variations or other factors.

FIG. 7 shows a laser system 200 representing an unstable laser architecture formed by two three-dimensional active mirrors 202 and 204. In this example, the three dimensional active mirrors 202 and 204 are each formed with a hemispherical shape, and each operates as both a mirror and as a gain media.

FIG. 8 shows a laser system 300 which forms a multi-active mirror linear optical resonator laser consisting of two three-dimensional active mirror elements 302 and 304. Coolant 312 and 314 may be supplied to both of the active mirror elements 302 and 304. Again, each one of the active mirror elements 302 and 304 operate as both a mirror and a gain media. Element 306 forms the output coupler of the laser resonator in this configuration.

The solid-state matrix used to make the three-dimensional active mirrors 202, 204, 302, 304 or the thin disc gain media 12, 52 or 106, may each comprise a homogeneous gain loaded matrix or a multi-layer matrix consisting of distinct layers of varying Rare Earth dopant concentrations and refractive indices. The Rare Earth dopants may include, but are not limited to, one or more of Erbium (Er), Ytterbium (Yb), Neodymium (Nd); Thulium (Tm); Praseodymium (Pr); Cerium (Ce); Holmium (Ho); Yttrium (Y); Samarium (Sm); Europium (Eu); Gadolinium (Gd); Terbium (Tb); Dysprosium (Dy); and Lutetium (Lu). Transition metals such as Chromium (Cr) and Titanium (Ti) may also be incorporated.

FIG. 9 shows one example of a three dimensional active mirror 400 having HR/AR coatings 402 and 404 on its inside or outside surfaces, the optical coatings by be uniform or tailored for resonator performance, and three distinct layers 406-410 of gain loaded matrix consisting of at least one optically active layer and at least one index match anti-ASE cap layer. It will be appreciated that a greater or lesser number of the matrix layers may be incorporated, and the use of three matrix layers 406-410 shown in FIG. 9 is therefore merely one example of how the gain loaded matrix may be implemented. The dopant concentration may be tailored to reduce ASE and to tailor gain and modal confinement, while the thickness of the layers 406-410 and refractive index may be tailored for modal constituency, thermal dissipation, pump efficiency, structural rigidity, and other design or operational considerations.

Additional Design Considerations

Figure 10:
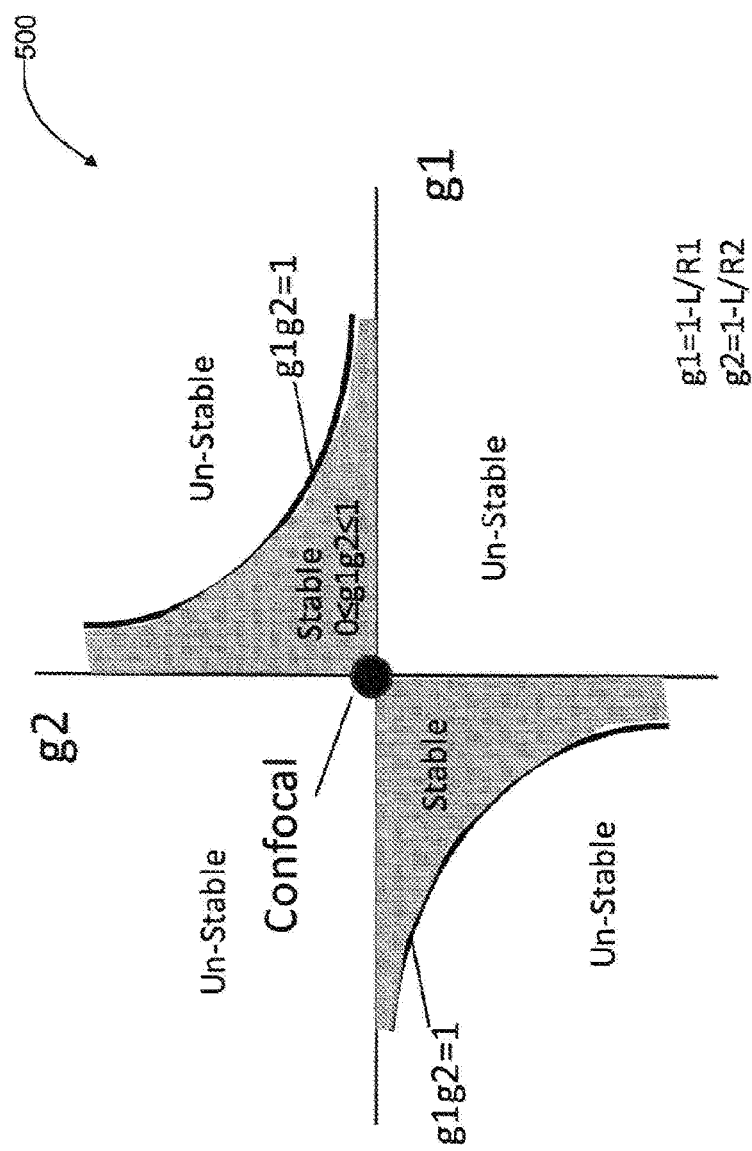
FIG. 10 shows a stability diagram for illustrating various resonator designs that may be established by utilization two mirrors each supporting a constant radius (parametrized at g1 and g2). Utilization of one or two active-mirrors in consistent with this application.

Referring to FIG. 10, a stability diagram 500 is shown to illustrate various beam patterns that may be produced for a laser resonator consisting of two spherical mirrors of radius R1 and R2 separated by a distance L. The stability criteria is defined as the product of g1*g2 falling between o and 1, where g1=1−L/R1 and g2=1−L/R2. The present invention, relating to non-flat active mirrors of radius R1 when coupled to a second mirror of radius R2, is applicable to both stable and unstable laser resonator architectures featuring single or dual active mirrors. Mirror configurations falling within the shaded region of FIG. 10 pertain to stable laser resonator architectures. Those outside this region are considered unstable.

Referring to FIGS. 11 and 12, a comparison between a well-known flat gain media disc 600 (FIG. 11) and a curved gain media disc 602 in accordance with one embodiment of the present disclosure is shown.

Referring to FIGS. 13-15, considerations for parameterizing ASE are illustrated. It will be appreciated that the ASE multiplier ("MASE") is the factor by which the power of a spontaneous emitted photon is amplified by the gain region of the non-flat disc, such as disc 800 in FIG. 14 or disc 900 in FIG. 15. The MASE is calculated by launching a number of rays from random locations and in random directions and adding up the total power emerging from the gain media where upon each pass of a ray through the gain media the ASE power is increased by $e^{gL}$. A local MASE can also be calculated by finding the total net power leaving some subregion of the gain media. Spatial gain variations can be incorporated if needed. FIG. 13 shows a graph 700 which illustrates how the MASE for a flat disc (line 702) which is shown as a constant line in the plot for the purpose of providing a simple comparison to the non-flat case. In the non-flat geometry (in this specific case hemispherical), the MASE is a function of the radius of curvature of the disc 704. Graph 700 further illustrates (portion 704a) that an optimal non-flat gain media radius maximizes this reduction; further increase in bend radius reduces the effect (portion 704b).

Figure 16:
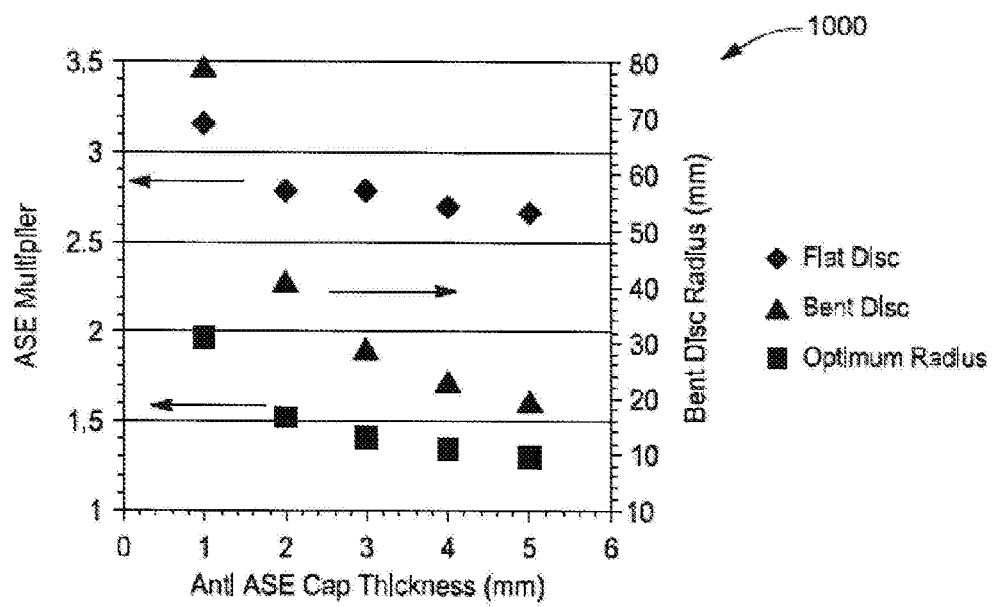
FIG. 16 shows a graph of the ASE multiplier vs. anti ASE cap thickness (in millimeters) for a flat gain media disc and a curved gain media disc (of constant radius), and also illustrates one example of an optimum radius for a curved gain media disc for minimizing the ASE multiplier.

FIG. 16 shows a graph 1000 of the ASE multiplier vs. anti ASE cap thickness (in millimeters) for a flat gain media disc and a curved gain media disc of optimal radius of curvature, where for a given ASE cap thickness an optimal radius has been calculated and plotted as green triangles whose values may be determined by comparison with the right hand vertical axis. FIG. 16 also illustrates that increasing the ASE cap thickness for a curved gain media disc continues to minimizing the ASE multiplier (red squares whose value can be determined from the left hand vertical axis), whereas in the flat case the benefit of the ASE cap is not increasing with increasing ASE cap thickness (blue diamonds whose value can be determined from the left hand vertical axis). The graph 1000 illustrates how a thicker cap for a curved given gain media disc can be used to significantly reduce the ASE compared to a flat disk with thicker anti-ASE cap.

Figures 17, 18:
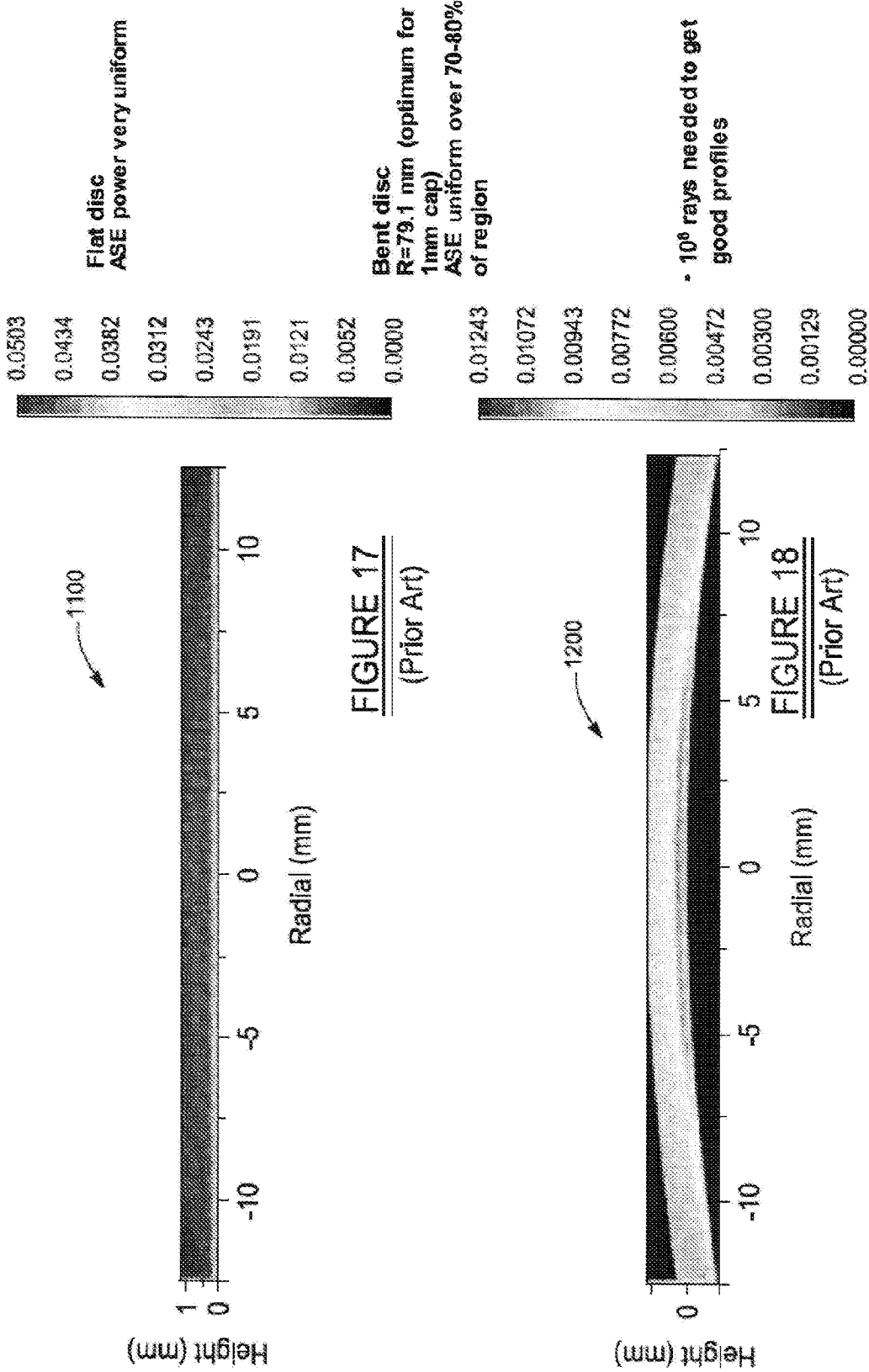
FIG. 17 shows examples of graphical distributions for the power distribution over an area of a conventional flat gain media disc.
FIG. 18 shows examples of graphical distributions for the power distribution over an area of a curved gain media disc illustrating a lower ASE power density for a hemispherical disk with an optimal anti-ASE cap thickness with respect to the ASE power density predicted in the flat disk.
Figure 19:
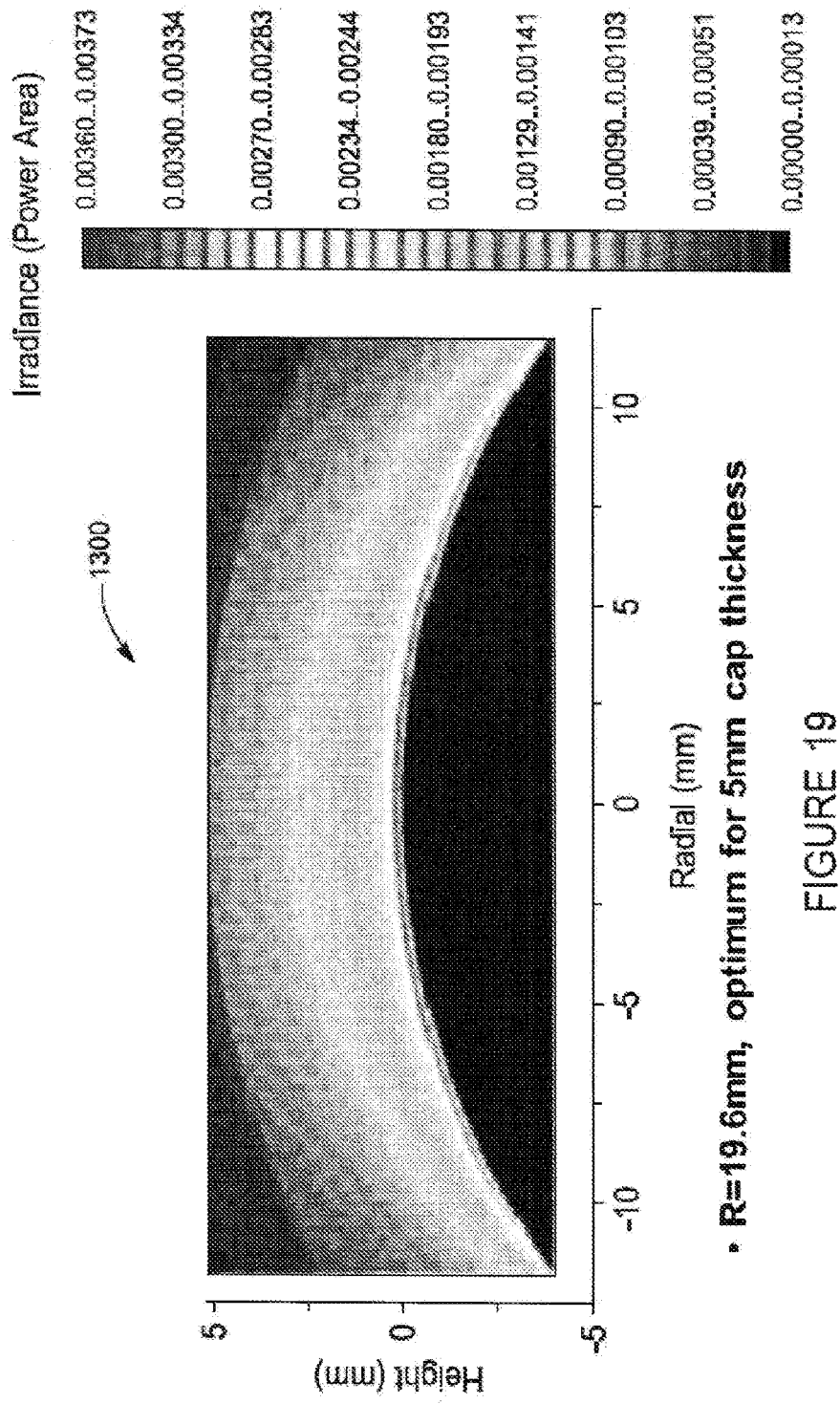
FIG. 19 shows a graph illustrating that for a given curved gain media disc, the ASE uniformity can be reduced by decreasing the radius of the hemispherical disk.

FIGS. 17 and 18 show graphical distributions for the power distribution over an area of a conventional flat gain media disc 1100, as shown in FIG. 17, versus a curved gain media disc 1200 shown in FIG. 18. In this example, FIG. 18 shows that the ASE is uniform over about 70%-80% of the surface of the curved gain media disc 1200 when the gain media disc 1200 has an optimal radius of 79.1 mm and cap thickness of 1 mm The uniformity of the ASE intensity for the curved disk is improved by a factor of 3-4 over that of the flat disk with comparable geometry. FIG. 19 shows a graph 1300 illustrating that for a given curved gain media disc, the ASE can be further reduced by reducing the radius of the disk for a given anti-ASE cap, constrained by the limits discussed above with regards to FIGS. 13 and 16.

FIG. 20 shows a pair of graphs 1400 and 1402 to illustrate how the curvature (both negative and positive) of a curved gain media disc may influence the MASE. Curve 1400 represents the ASE multiplier for a cap of a curved gain media disc having a 1 mm thickness, and curve 1402 represents the ASE multiplier for a cap of a curved gain media disc having a 4 mm thickness. FIG. 20 shows the benefit of the configuration only occurs for thin disc radius of curvatures greater than zero, where positive and negative curvature are as defined above.

FIG. 21 illustrates a prior art flat gain media disc 1500 and a path length 1500a of one ray through the disc, while FIG. 22 illustrates a curved gain media disc 1502 with a path length of one ray 1502a through the disc. In this example the path ASE multiplier is significantly greater for the curved gain media disc 1502.

Figure 24:
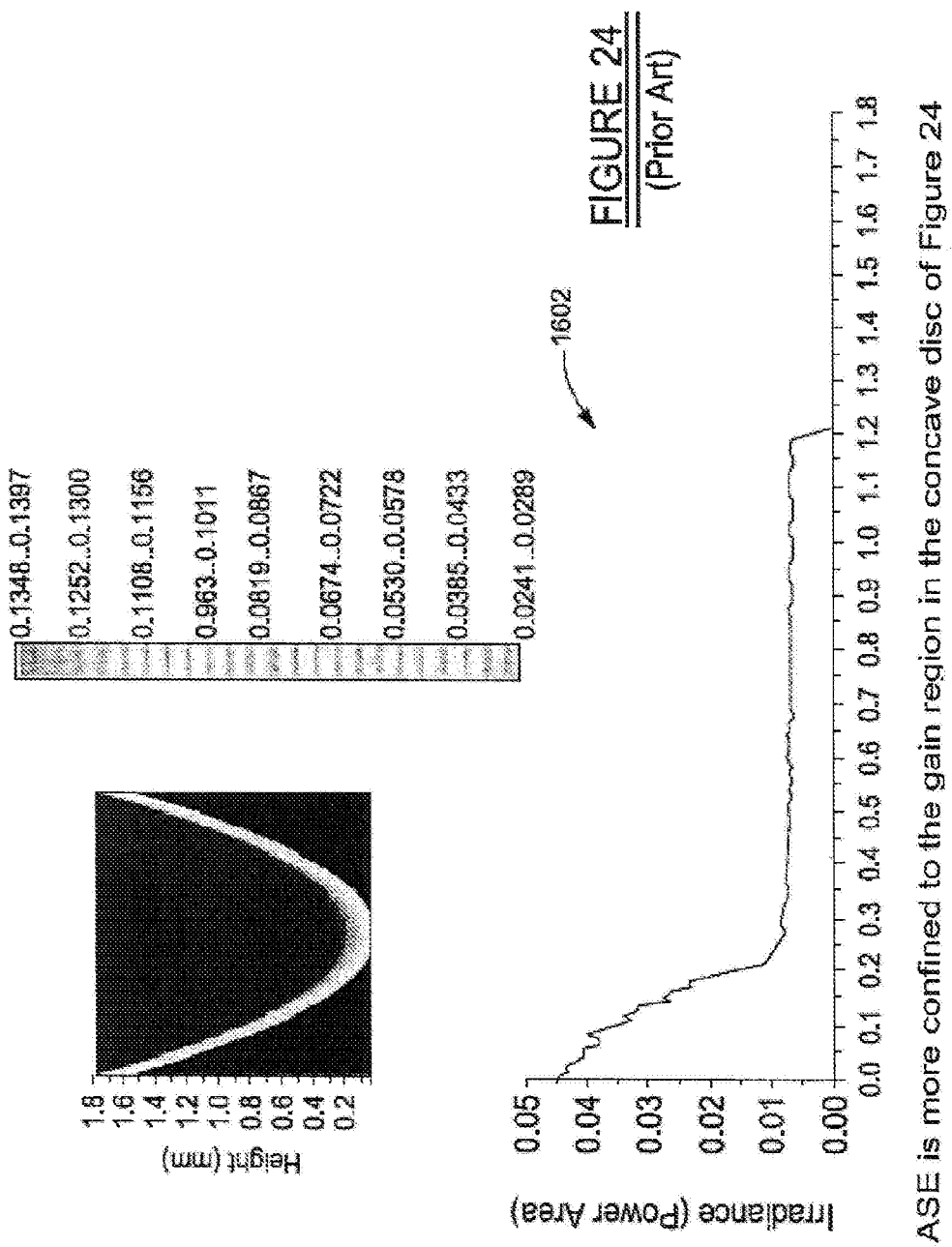
FIG. 24 illustrates a graph of the distribution of the ASE multiplier, relative to height, of a concave gain media disc.

FIG. 23 illustrates a graph 1600 of a distribution of the ASE of a conventional flat gain media disc, relative to height, while FIG. 24 illustrates a graph 1602 of the distribution of the ASE multiplier, relative to height, of a concave gain media disc.

Figure 25:
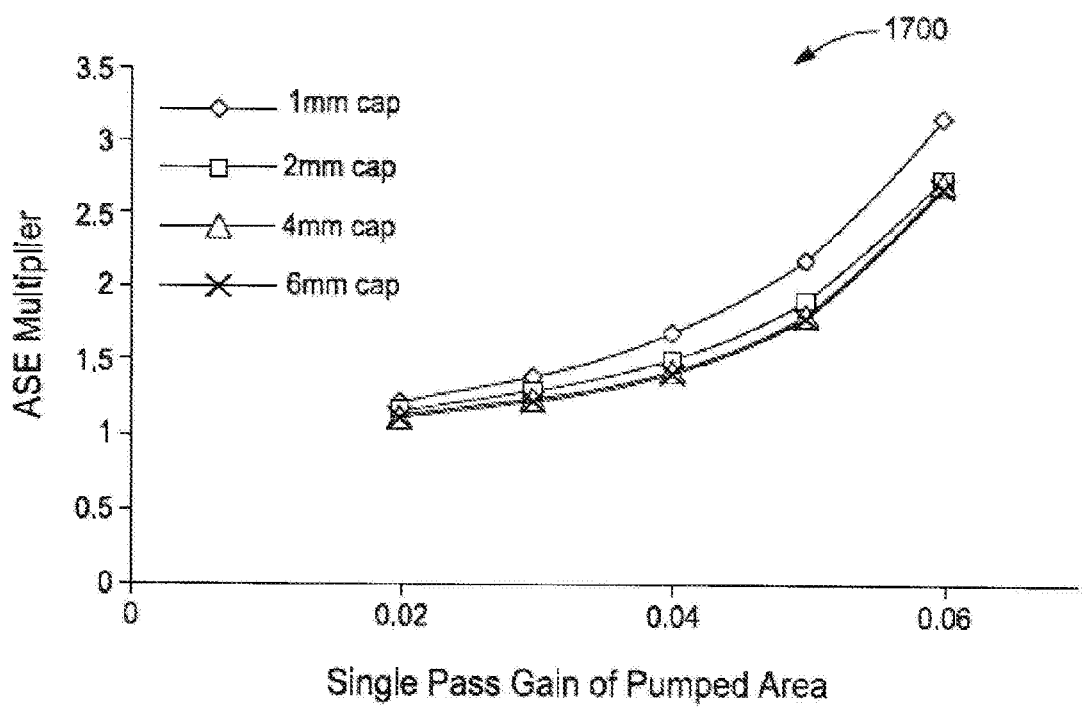
FIG. 25 shows a graph that illustrates a plurality of curves showing examples of the single-pass gain for the pumped area of a conventional flat gain media disc, for pumped areas of different diameters.

FIG. 25 shows a graph 1700 that illustrates a plurality of curves showing examples of the single-pass gain for the pumped area of a conventional flat gain media disc, for pumped areas of different diameters. FIGS. 26 and 27 show graphs 1800 and 1900, respectively, which illustrate examples of how a curved gain media disc allows for a larger pumped area.

A curved disc 2000 is shown in FIG. 28 in accordance with another embodiment of the present disclosure. The curved disc 2000 in this example includes an index and gain tailored multi-layer composite active mirror containing a substrate portion 2002 and a layer forming a gain tailored portion 2004. The layer forming a gain tailored portion, i.e., gain tailored portion 2004, may be formed collectively by portions 2004a and 2004b. Optionally, three or more distinct portions may be provided. Optical coatings may also be used on interior 2005 and exterior 2001 surfaces, respectively. One or more of the portions 2004a and 2004b may contain an active media defined within a central portion of the curved shell that forms the curved disc 2000. The composite mirror layers 2002, 2004a and 2004b form layers which may be matched with respect to coefficient of thermal expansion and index of refraction to minimize optical reflections between layers and to mitigate stress related thermal effects. Restricting the active media (i.e., the layers of media capable of optical amplification actuated by optical pumping) to a central portion of the curved disc 2000 enables mode tailoring by offsetting the confinement factors of higher order modes to favor fundamental mode (or a sub-set of modes) operation for power scaling.

A curved active disk mirror 2900 is illustrated in FIG. 29 which is configured to operate as a laser amplifier. Under optical excitation via pump source 2901, pump radiation is reflected back to the active curved disk 2903 via a series of reflectors 2902 redirecting the portion of pump radiation reflected by the curved disk (reflected pump beams), thereby increasing the pump absorption efficiency of the curved disk. The pump beams are absorbed by the active pump disc 2903 (i.e., the active element) and re-emitted via stimulated emission to amplify the incident laser radiation forming an output laser beam 2904 of higher optical power.

The foregoing description of the various embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the description above contains many details and specifics, these should not be construed as limiting the scope of the application but as merely providing illustrations of some of the presently preferred embodiments of the apparatus, systems, and methods. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present application fully encompasses other embodiments which may become obvious to those skilled in the art. In the claims, reference to an element in the singular is not intended to mean "one and only one" unless explicitly so stated, but rather "one or more." All structural and functional equivalents to the elements of the above described embodiments that are known to those of ordinary skill in the art are expressly incorporated herein by reference and are intended to be encompassed by the present claims. Moreover, it is not necessary for a device to address each and every problem sought to be solved by the present apparatus, systems, and methods, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

While the apparatus, systems, and methods may be susceptible to various modifications and alternative forms, specific embodiments have been shown by way of example in the drawings and have been described in detail herein. However, it should be understood that the application is not intended to be limited to the particular forms disclosed. Rather, the application is to cover all modifications, equivalents, and alternatives falling within the spirit and scope of the application as defined by the following appended claims.

What is claimed is:

1. A laser system comprising:
   a non-flat gain media disc forming at least one optical component;
   at least one pump source configured to generate a laser beam directed toward a convex surface of the non-flat gain media disc, that pumps the convex surface of the non-flat gain media disc;
   the non-flat gain media disc having a gain media disposed against a non-flat substrate, with the gain media shaped to follow a contour of an outer surface of the non-flat substrate, and where the non-flat substrate and the gain media are matched to one another in index of refraction and coefficient of thermal expansion, to reduce reflection and stress therebetween;
   an output coupler which forms a laser cavity in combination with the optical component, the output coupler enabling the laser beam to exit the laser cavity.

2. The laser system of claim 1, further comprising a mirror for receiving and reflecting the beam from the pump source back to the at least one optical component.

3. The laser system of claim 1, wherein the non-flat gain media disc comprises a hemispherical shaped gain media disc.

4. The laser system of claim 3, wherein the non-flat substrate comprises a hemispherical shaped substrate, and wherein the gain media comprises a hemispherical shaped gain media, and where the hemispherical shaped substrate is secured to one surface of the hemispherical shaped gain media.

5. The laser system of claim 4, wherein the hemispherical shaped substrate further includes a highly reflective coating on a surface thereof opposite to that which the hemispherical shaped gain media is secured to.

6. The laser system of claim 1, further comprising:
   an additional pump source for generating an additional beam; and
   a mirror for reflecting the additional beam toward the at least one optical component.

7. The laser system of claim 1, wherein the non-flat gain media disc comprises a solid state matrix material.

8. The laser system of claim 7, wherein the solid state matrix material includes at least one type of Rare-Earth dopant, or at least one type of transition metal, or a combination of at least one type of Rare-Earth dopant and at least one type of transition metal, from the following: Erbium (Er), Ytterbium (Yb), Neodymium (Nd), Thulium (Tm); Praseodymium (Pr); Cerium (Ce); Holmium (Ho); Yttrium (Y); Samarium (Sm); Europium (Eu); Gadolinium (Gd); Terbium (Tb); Dysprosium (Dy); Lutetium (Lu); Chromium (Cr) and Titanium (Ti).

9. The laser system of claim 1, wherein the non-flat gain media disc comprises a hemispherical shaped gain media disc having a plurality of layers of gain loaded matrix material sandwiched together.

10. The laser system of claim 9, further comprising a first highly reflective coating applied to a first outer surface of the hemispherical shaped gain media disc.

11. The laser system of claim 10, further comprising a second highly reflective coating applied to a second outer surface of the hemispherical shaped gain media disc.

12. The laser system of claim 1, wherein the at least one optical component forms an active mirror.

13. The laser system of claim 1, further comprising a heat sink coupled to the substrate.

14. The laser system of claim 1, further comprising a coolant supplied to the non-flat substrate for cooling the at least one optical component.

15. The laser system of claim 1, wherein the output coupler receives the laser beam from the at least one optical component and outputs the laser beam to an external component.

16. A laser system comprising:
- a first pump source configured to generate a first beam;
- a second pump source configured to generate a second beam;
- a first mirror for receiving the first beam;
- a second mirror for receiving the second beam;
- a non-flat, thin disc gain media optical component for receiving the first and second beams on a convex surface thereof, after the first and second beams have been reflected from the first and second mirrors, the first and second beams thus exciting the non-flat, thin disc gain media;
- the non-flat, thin disc gain media optical component forming a hemispherical shaped thin disc gain media optical component having a substrate and a gain media, the substrate and the gain media being matched to one another in both index of refraction and coefficient of thermal expansion, to reduce reflection and stress therebetween; and
- an output coupler for forming a resonant laser cavity with the hemispherical shaped, thin disc gain media.

17. The system of claim 16, wherein at least one of the first and second mirrors comprises an active mirror having a hemispherical shaped, thin disc gain media.

18. The system of claim 16, wherein both of first and second comprise active mirrors each having a hemispherical shaped, thin disc gain media.

* * * * *